R. N. WERSTLER.
IRRIGATION APPARATUS.
APPLICATION FILED SEPT. 18, 1920.

1,410,434. Patented Mar. 21, 1922.

INVENTOR
Roy N. Werstler
BY Freese, Merkel, Sywell & Bond
ATTYS.

UNITED STATES PATENT OFFICE.

ROY N. WERSTLER, OF HARTVILLE, OHIO.

IRRIGATION APPARATUS.

1,410,434.  Specification of Letters Patent.  Patented Mar. 21, 1922.

Application filed September 18, 1920. Serial No. 411,200.

*To all whom it may concern:*

Be it known that I, ROY N. WERSTLER, a citizen of the United States, residing at Hartville, in the county of Stark and State of Ohio, have invented a new and useful Irrigation Apparatus, of which the following is a specification.

This invention relates to improvements in irrigating apparatus and has for its objects the provision of an arrangement of sprinkling pipes mounted for rotary movement, means being provided for imparting a continuous oscillating movement to the pipes in order that the nozzles or perforations which are provided throughout the length of the pipes will discharge water evenly over a wide territory extending a considerable distance beyond each side of each pipe, thus uniformly moistening the ground at all points within said territory.

With these and other objects in view, the invention consists in the novel construction and arrangement of parts hereinafter described, illustrated in the accompanying drawings and pointed out in the appended claims, it being understood that various changes in the form, size and details of construction may be made without departing from the invention.

Figure 1:
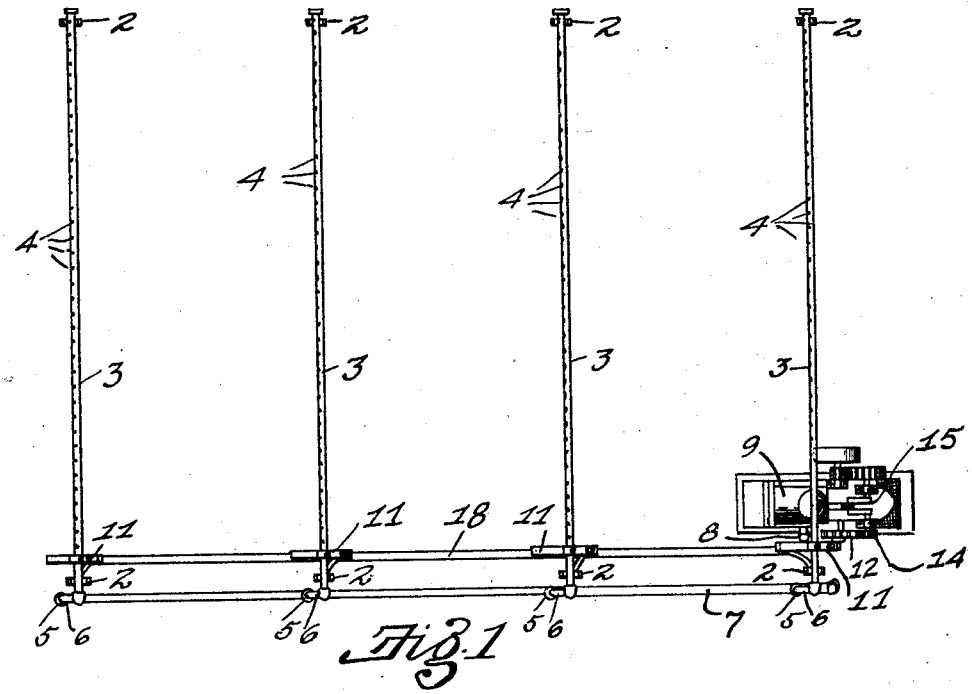
Figure 2:
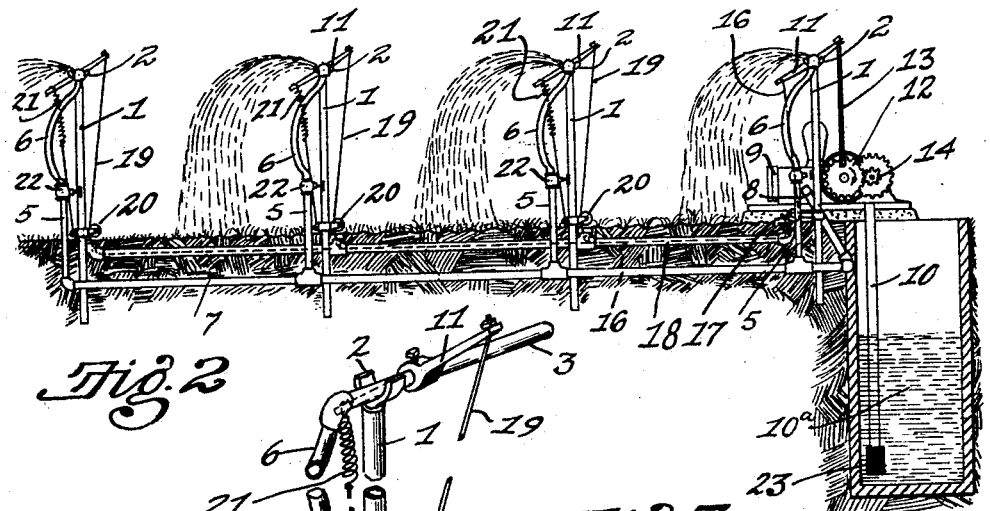

The invention thus set forth in general terms is illustrated in the accompanying drawings forming part hereof in which;

Figure 1 is a plan view of an irrigation apparatus embodying the invention,

Fig. 2 a side elevation of the same, parts being shown in section, and

Figure 3:
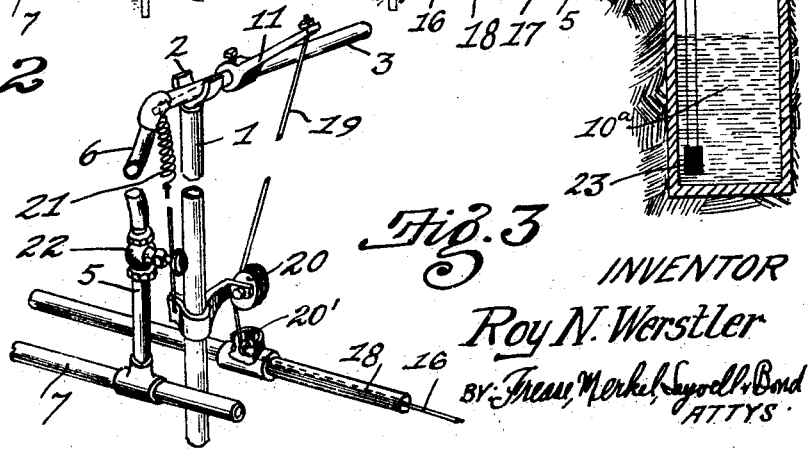

Fig. 3 a perspective view of a portion of one of the sprinkling pipes showing the rocking or oscillating means.

Similar numerals of reference indicate corresponding parts throughout the several views.

Referring to the construction illustrated in the drawings, a plurality of spaced standards are shown at 1, each of these standards being provided at its upper extremity with a bearing 2 within which are mounted the sprinkling pipes 3, provided throughout their length with nozzles or perforations 4.

Each of the sprinkling pipes is connected at one extremity to a vertical supply pipe 5 by means of a flexible tube 6, said vertical supply pipes being connected to the feed pipe 7 which is connected as shown at 8 to the cylinder of a pump 9, said pump being connected by means of the pipe 10 with a tank or cistern 10ª, preferably located beneath the level of the ground.

A rock arm 11 is connected intermediate its extremities to each of the sprinkling pipes. The rock arm upon the pipe adjacent to the pump is connected at one end to the gear 12 by means of the pitman rod 13. The gear 12 is driven by the pinion 14 mounted upon the crank shaft 15 of the pump. The other end of this rock arm is connected to the wire or cable 16 which is carried down over the pulley 17 and through a pipe 18 located beneath the level of the ground, the other end of this cable being connected to the rock arm 11 upon the pipe 3 most remote from the pump.

A wire or cable 19 is connected to one end of each of the other rock arms and is passed down over suitable pulleys 20 and 20′ and connected to the cable 16, the other extremity of each of said rock arms being connected to a spring 21 which is connected in any suitable manner to the adjacent upright 1.

In order that any of the sprinkling pipes may be cut out if desired, a globe valve 22 is provided in each of the supply pipes. A strainer 23 is preferably provided around the end of the intake pipe 10.

The operation of the device is as follows: When the pump is started water is drawn up from the tank 10ª through the pipe 10 and discharged from the pump through the supply pipe 7 to the sprinkler pipes 3. At the same time the sprinkler pipes are oscillated through the gears 12—14, pitman rod 13, cable 16 and rock arms 11, the springs 21 pulling the rock arms to the initial position after each movement in the other direction by the cable.

From the above description and the accompanying drawings it will be evident that an irrigation apparatus is provided by means of which the sprinkling pipes are continually oscillated during the operation of the pump which supplies the sprinkling pipes with water, thus causing the ground to be evenly and uniformly moistened and producing as nearly as is possible with mechanical means, the same effect as is produced by rain.

I claim:

1. An irrigation apparatus comprising a series of oscillatory sprinkler pipes, a supply pipe to which all of said sprinkler pipes are connected, a pump for forcing water through said supply pipe, a rock arm upon each sprinkler pipe, means operatively connecting the pump with the adjacent end of the nearest rock arm, a cable connecting the other end of said rock arm with one end of each of the other rock arms and a spring connected to the other end of each of said other rock arms.

2. An irrigating apparatus comprising a series of spaced brackets, oscillatory sprinkler pipes journaled in said brackets, a supply pipe to which each sprinkler pipe is connected, a pump for forcing water through said supply pipe, a rock arm upon each sprinkler pipe, a pitman rod operatively connecting the pump with the adjacent end of the nearest rock arm, a cable connected to the other end of said rock arm and passing downwardly over the pulleys and connected to the opposite end of the farthest rock arm, short cables connecting said first named cable to one arm of each intermediate rock arm and a spring connected to the free end of the farthest rock arm and to each intermediate rock arm.

In testimony that I claim the above, I have hereunto subscribed my name.

ROY N. WERSTLER.